(12) United States Patent
Hirose

(10) Patent No.: US 6,929,377 B2
(45) Date of Patent: Aug. 16, 2005

(54) LIGHT-REFLECTIVE MATERIAL AND LIGHT SOURCE DEVICE USING THE SAME

(75) Inventor: Yukio Hirose, Kawagoe (JP)

(73) Assignee: Kimoto Co., Ltd. (JP)

(*) Notice: Subject to any disclaimer, the term of this patent is extended or adjusted under 35 U.S.C. 154(b) by 198 days.

(21) Appl. No.: 10/291,839

(22) Filed: Nov. 12, 2002

(65) Prior Publication Data

US 2003/0096067 A1 May 22, 2003

(30) Foreign Application Priority Data

Nov. 16, 2001 (JP) .......................................... 2001-351662

(51) Int. Cl.⁷ ................................................. F21V 7/00
(52) U.S. Cl. ........................................ 362/31; 362/296
(58) Field of Search ............................ 362/26, 31, 296, 362/331, 341; 428/72, 166, 178, 198

(56) References Cited

U.S. PATENT DOCUMENTS 3,716,445 A * 2/1973 Lemelson .................... 428/166
5,868,486 A * 2/1999 Takano et al. ................. 362/31
6,254,244 B1 * 7/2001 Ukai et al. ..................... 362/31
2003/0068466 A1 * 4/2003 Mimura et al. .............. 428/102

FOREIGN PATENT DOCUMENTS

JP          11-300814          11/1999
JP          2001-166295        6/2001

* cited by examiner

Primary Examiner—Y. My Quach-Lee
(74) Attorney, Agent, or Firm—Lorusso & Loud

(57) ABSTRACT

There is provided a light-reflective material with which light reflectance can be efficiently increased and brightness of a flat light source can be improved without increasing the number of components. This light-reflective material comprises a laminate formed by partially bonding at least two white plastic films while holding a space therebetween. Preferably, the white plastic films are partially bonded as a laminate while holding a space therebetween by an adhesion layer formed on portions of the white plastic film surface or an adhesion layer that has projections and is formed on the white plastic film surface.

16 Claims, 3 Drawing Sheets

LIGHT-REFLECTIVE MATERIAL AND LIGHT SOURCE DEVICE USING THE SAME

CROSS-REFERENCE TO RELATED APPLICATIONS

This application claims, under 35 USC 119, priority of Japanese Application No. 2001-351662 filed Nov. 16, 2001.

BACKGROUND OF THE INVENTION

The present invention relates to a light-reflective material used as a light-reflection member in a backlight of various display devices such as a liquid crystal display, illuminated signboard, lighting equipment and so forth, and it relates to a light-source device using the same.

Conventionally, a flat light source that lights from the back face of a signboard, a display board or the like, includes a plurality of rod-like light sources such as fluorescent lamps and a diffusion board, a diffusion sheet or a diffusion material formed of a combination thereof is disposed on the front face of the light source, and a light-reflective material is disposed in the back of the light source. In addition to such a backlight called a direct type, flat light sources include an edge-light type backlight, in which a lamp such as a cold-cathode tube is disposed at an end portion of a transparent plate called a light guide plate, and which is used for multiple purposes such as liquid crystal displays and the like. In these flat light sources, a light-reflective material is wrapped partially around the lamp or disposed on a surface opposite the light-emitting surface of the light guide plate. As the light-reflective material for flat light sources, a white plastic film is used in which a white pigment is mixed in a synthetic resin or in which a multiplicity of fine holes are formed in the synthetic resin sheet.

In order to increase brightness of the flat light source, attempts have been made to increase the light reflectance of the aforementioned light-reflective material, to increase the brightness of a light source such as a fluorescent light and to increase transmittance of a diffusion material or the like. As a method of increasing the light reflectance of the light-reflective material, stacking a plurality of white plastic films and increasing the thickness of the film itself are approaches that have been employed.

However, when films are stacked to increase the light reflectance, the number of components of the flat light source is increased. Therefore, a problem arises that excessive labor is required for each component when the light-reflective material is processed into an appropriate shape as required or wound about a lamp, for example. On the other hand, the method involving increasing the thickness of the film itself to increase the light reflectance is also undesirable since flexibility may be reduced when the light-reflective material is processed into an appropriate shape as required or wound about a lamp. Further, although its cause is not clear, when the thickness of the film itself is increased to increase the light reflectance, the amount of increase in the light reflectance is lower than when the films are stacked to increase the light reflectance, even though materials of the white plastic film and the total thicknesses are the same.

SUMMARY OF THE INVENTION

Accordingly, an object of the present invention is to increase light reflectance of a light-reflective material efficiently and to improve brightness of a flat light source without increasing the number of components to be incorporated into the flat light source. Another object of the present invention is to provide a light-reflective material having excellent flexibility as well as excellent processability and workability when incorporated into a flat light source or processed.

In order to achieve the above objects, the inventors of the present invention examined increasing the thickness of a light-reflective material, not simply by stacking white plastic films, but integrally bonding them. However, when the thickness of the light-reflective material is increased simply by integrally bonding the films, a new problem arose in that the increase in the light reflectance was less than when films were simply stacked. As a result of further assiduous studies, they found that the light reflectance was significantly increased when a predetermined air layer was provided between the bonded white plastic films.

Specifically, the light-reflective material of the present invention comprises a laminate formed by partly bonding at least two white plastic films while holding space therebetween.

Further, the light-reflective material of the present invention comprises a laminate formed by partially bonding at least two white plastic films through an adhesion layer formed on portions of facing surfaces of the white plastic films while holding a space between other portions of the surfaces of the white plastic films.

Further, the light-reflective material of the present invention comprises a laminate formed by partially bonding facing surfaces of at least two white plastic films through an adhesion layer which has projections and which is formed on a surface of a white plastic film while holding space between the white plastic films.

Further, the light source device of the present invention adopts the above-described light-reflective material as its light-reflective material. The light source device may be an edge-light type light source comprising a light guide plate and at least one lamp disposed at an end of the light guide plate, or a direct type light source comprising at least one lamp in a substantially planar array, a light diffusion member disposed at one side of the lamp (or lamp array) and a light-reflective member disposed at another side of the lamp. In an application to the edge-light type light source, the light-reflective material of the present invention is disposed partially surrounding the lamp and/or opposite the light-emitting surface of the light guide plate.

DETAILED DESCRIPTION OF THE PREFERRED EMBODIMENTS

Hereafter, preferred embodiments of the light-reflective material of the present invention will be described in detail.

The light-reflective material of the present invention comprises a laminate formed by bonding portions of at least two white plastic films together while holding space therebetween. At least two white plastic films may be partly bonded as a laminate while holding space therebetween either by an adhesion layer formed only on portions of the white plastic film surface or by an adhesion layer having projections and formed over an entire surface of a white plastic film.

The white plastic film may be a film obtained by mixing a white pigment in a synthetic resin, a film made of a synthetic resin with a multiplicity of internal fine voids or the like can be used. Examples of the synthetic resin include general use synthetic resins such as polyester resins, polyethylene resins, polystyrene resins, polypropylene resins, polyether resins, polyurethane resins, polyvinyl chloride resins, polyvinyl acetate resins, acrylic resins, epoxy resins and cellulose resins. In particular, polyester resins such as polyethylene terephthalate are preferably used. When two sheets of white plastic film are bonded directly without using adhesives, at least one of the plastic films should be thermoplastic. Further, as the white pigment, barium sulfate, titanium oxide, zinc oxide, calcium carbonate, magnesium carbonate or the like can be used. In particular, barium sulfate and titanium oxide are preferred for efficiently increasing light reflectance of a white plastic film.

The thickness of the white plastic film depends on the content of the white pigment and voids contained in the white plastic film, but the range of 25 to 300 $\mu$m is preferred. When the thickness is 25 $\mu$m or greater, the number of white plastic films to be laminated can be within an appropriate range to sufficiently increase the light reflectance of the light-reflective material. When the thickness is 300 $\mu$m or less, the film after processing of the light-reflective material can be wound about a lamp without any trouble or processed to an appropriate shape.

The structure of a laminate formed by partly bonding at least two white plastic films while holding space therebetween will be described below.

Figure 1:
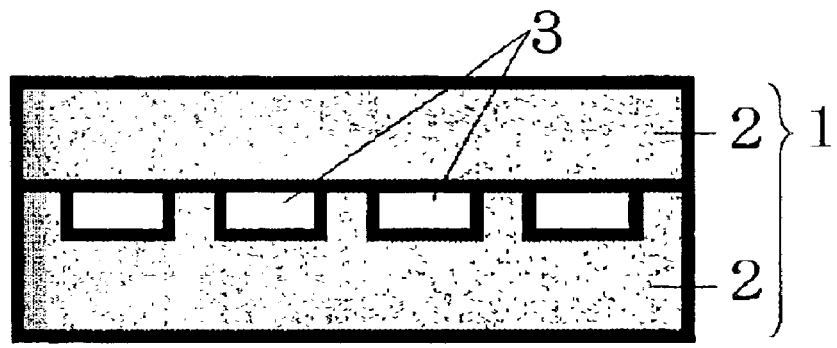
FIG. 1 is a cross sectional view showing one embodiment of the light-reflective material of the present invention.

The light-reflective material comprising a laminate formed by partly bonding at least two white plastic films while holding space therebetween can be obtained by, for example, providing a white plastic film 2 having projections and depressions on its surface, melting tops of the projections by a solvent or heat and bringing these tops into contact with a surface of a superposed white plastic film 2 so that the tops are bonded by fusion to the surface of this superposed white plastic film 2. Thus the white plastic films 2 are partly bonded as a laminate without having any other substance therebetween while holding space 3 in portions corresponding to depressions of the white plastic film 2 surface as shown in FIG. 1.

Protrusions and depressions of the plastic film can be produced by embossing, molding or the like. Although the shape, gap (distance between protrusions) and thickness of protrusions are not particularly limited so long as an appropriate space can be provided between the two plastic films, for example, the width of protrusion may be in the range of 0.1 to 10 mm, the gap may be in the range of 0.1 to 500 mm and the thickness may be in the range of 5 to 50 $\mu$m.

Figure 2:
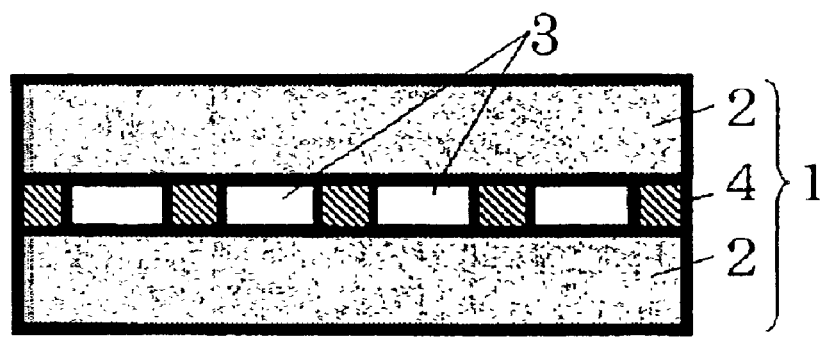
FIG. 2 is a cross sectional view showing another embodiment of the light-reflective material of the present invention.
Figure 3:
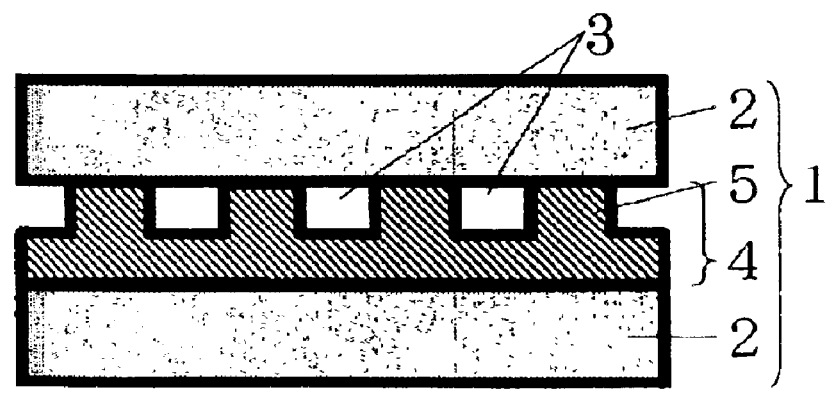
FIG. 3 is a cross sectional view showing yet another embodiment of the light-reflective material of the present invention.

Alternatively, in order to partially bond at least two white plastic films as a laminate while holding space therebetween, an adhesion layer 4 may be formed on portions of a white plastic film 2 surface as shown in FIG. 2 or an adhesion layer 4 having projections 5 may be formed on the white plastic film 2 surface as shown in FIG. 3. Space 3 can be held between the two white plastic films 2 by utilizing non-adhered portions of the white plastic film 2 surface or depressions of the adhesion layer 4.

As described above, the light-reflective material comprising a laminate formed by partly bonding portions of at least two white plastic films while holding space as a gap therebetween, via an adhesion layer or the like, exhibits an excellent increase in light reflectance in comparison with a case wherein the whole surfaces of white plastic films are simply bonded. The reason why light reflectance of the light-reflective material is significantly increased when space is provided between two adjacent white plastic films is not elucidated but it is inferred that, in addition to diffused reflection inside the white plastic films, interface reflection from the white plastic film surface is added to the light reflectance of the whole light-reflective material.

Further, in addition to the effect of increasing the light reflectance, the space between films serves to reduce deformation due to bending or the like in the light-reflective material formed by thus laminating white plastic films so as to hold space in a gap between the two white plastic films. Consequently, even when the total thickness of the light-reflective material is increased, flexibility is not reduced, and thus properties of the light-reflective material required for processing into an appropriate shape as required or wound about a lamp is improved.

The specific shape and size of the space having such an effect as described above are not particularly limited, but, for example, shapes such as scattered points, stripes, lattice and honeycomb can be adopted. The percentage of the area of the white plastic film surface over which the space extends is preferred to be as high as possible. The gap between the white plastic films is preferably in the range of 5 to 50 $\mu$m.

The light-reflective material formed by laminating at least two white plastic films via an adhesion layer can be imparted with excellent flexibility in comparison with other light-reflective materials formed by bonding the white plastic films by fusion without having any other substance therebetween.

Here, an adhesive for forming an adhesion layer to bond two white plastic films is not particularly limited, but adhesives for a dry laminate or hot melt such as acrylic resins, polyurethane resins, polyester resins and polyether resins or a pressure-sensitive type adhesive can be used. When an adhesive for a dry laminate is used, it is preferable to select a two-part curing type, with which an isocyanate curing agent or the like can be appropriately used in combination. When an adhesive of a pressure-sensitive type is used, flexibility of the light-reflective material can be further improved. It is effective to impart the light-reflective material with antistatic property by employing an adhesion layer having antistaticity.

The adhesion layer formed on portions of the white plastic film surface can be provided by applying an adhesive onto the white plastic film surface by screen-printing etc. in a desired shape (shapes such as scattered points, stripes, lattice or honeycomb). The shape, gap, thickness and so forth of the adhesion layer are not particularly limited, and an appropriate shape, gap and thickness can be selected as required. Specifically, as the shape of the adhesion layer, the width is preferably in the range of 0.1 to 10 mm, the gap of the adhesion layer is preferably in the range of 0.1 to 500 mm and the thickness of the adhesion layer is preferably in the range of 5 to 50 $\mu$m.

The adhesion layer having projections can be formed by, for example, applying an adhesive on a mold release sheet with grooves embossed in a shape such as scattered points, stripes, lattice or honeycomb or the like and drying the adhesive to form an adhesion layer, bonding the white plastic film surface on the adhesion layer, and transferring the adhesion layer to the white plastic film surface. Here, the shape, gap, thickness and so forth of the projections formed on the adhesion layer surface are not particularly limited so long as the depressions can hold space between two white plastic films, and an appropriate shape, gap and thickness can be selected as required. The width of the projection is preferably in the range of 0.1 to 0.4 mm, the gap of the projection is preferably in the range of 0.1 to 0.4 mm and the thickness of the projection is preferably in the range of 10 to 50 μm.

The thickness of the whole light-reflective material of the present invention depends on the thickness of the white plastic film and of the adhesion layer, but is preferably 1000 μm or less, more preferably 700 μm or less. When the thickness is 1000 μm or less, good processability and workability can be achieved when the light-reflective material is wound about a lamp or processed into an appropriate shape.

As described above, the light-reflective material of the present invention efficiently increases light reflectance, and brightness of a flat light source can be improved without increasing the number of components.

Although light-reflective materials consisting of two plastic films are illustrated in the figures, the light-reflective material of the present invention may be a laminate of three or more sheets of plastic films. In such a structure, only two plastic films may be bonded so as to have space therebetween or all of the plastic films may be bonded such that adjacent films have space therebetween.

Next, a light source device using the light-reflective material of the present invention will be explained in detail hereinafter.

Figure 6:
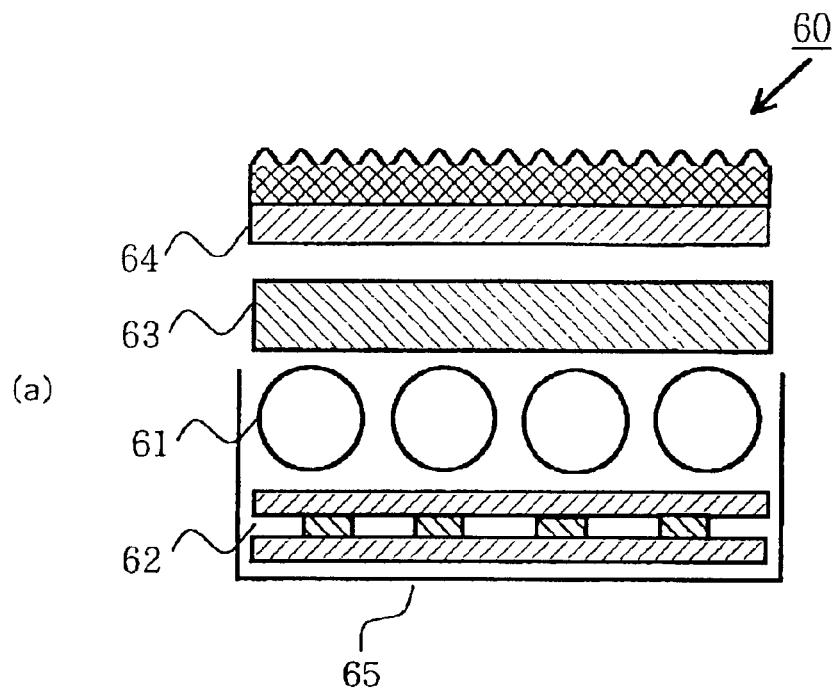
FIG. 6 shows an embodiment of a direct type light source to which the present invention is applied.

FIG. 6 shows a sectional side view of an embodiment of a direct type backlight of the present invention. This light source device 60 has a structure where a plurality of rod-like lamps such as fluorescent lamps 61 are arranged in parallel, a light reflection plate 62 is disposed under the lamps and diffusion members (63, 64) are disposed over the lamps. The light reflection plate 62 and the lamps 61 are arranged in a frame 65. The diffusion members are provided to erase patterns (images) of the lamps and may be opaque white resin plates, transparent films provided with a dot-pattern (lighting curtain), diffusion films comprising an uneven light diffusion layer formed on a transparent resin plate surface or any combination thereof. In the illustrated embodiment, an opaque white resin plate 63 and a diffusion film 64 are used in combination. In addition, an electromagnetic wave shielding film may be disposed at the upper side of the lamp 61, depending on its application.

The reflection plate 62 of the light source device 60 is composed of a light-reflective material comprising a laminate formed by bonding at least two white plastic films so as to produce a space therebetween as afore-mentioned. Since such a light-reflective material can be treated as one sheet of a light-reflective material, good processability and workability can be obtained when it is incorporated into the light source device 60 and yet brightness equal to or more than that of a stacked plurality of light reflection plates can be achieved.

Figure 7:
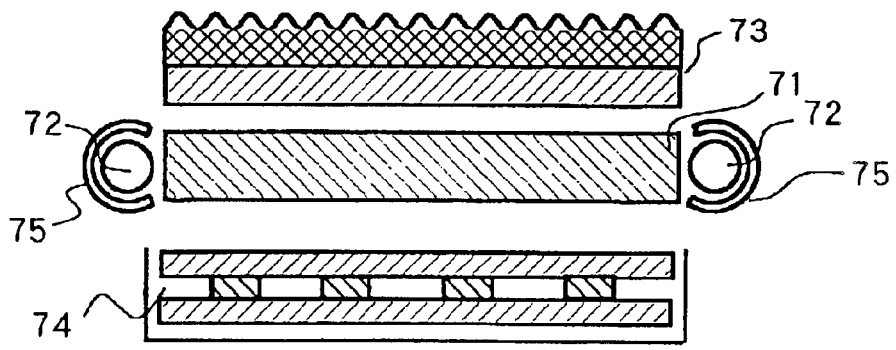
FIG. 7 shows an embodiment of an edge-light type light source to which the present invention is applied.

The backlight shown in FIG. 6(a) is only one example of a light source device to which the light-reflective material of the present invention can be applied. The light-reflective material of the present invention can be applied to any other kind of light source using a light-reflective material. Another example of a direct type backlight is shown in FIG. 6(b), in which a bellows-like frame 66 and a light reflection plate having the same shape 67 are combined, rod-like lamps 68 are disposed in depressions of light reflection plate 67 and covered with a diffusion member such as a resin plate 69. In this backlight, the light-reflective material of the present invention is used as the light reflection plate 67. FIG. 7 shows another example of a light source device to which the present invention is applied, in which a rod-like lamp 72 is disposed at one (or both) end of a light guide plate 71, a diffusion member such as a diffusion film 73 is disposed on a light-emitting surface of the light guide plate 71 and the light reflection plate 74 is disposed on the opposite side of the light guide plate 71. In this case, the light-reflective material of the present invention is used not only for the light reflection plate 74 but also for a lamp reflector 75 which partially covers the lamp 72. Since the light-reflective material of the present invention has excellent flexibility, it is incorporated into the lamp easily and exhibits a good light-shielding property as a lamp reflector. Accordingly, light emitted from the lamp 72 is introduced into the light guide plate efficiently and emitted from the light-emitting surface of the plate to give a high brightness.

EXAMPLES

Hereafter, the present invention will be explained more specifically with reference to the following examples. In the following examples, "part" and "%" are used on a weight basis unless otherwise indicated.

Example 1

Polyethylene was laminated on wood free paper having a basis weight of 110 g/m$^2$ and a thickness of 30 μm. Cone-shaped depressions, with an opening having an inside diameter of 0.3 mm and a depth of 20 μm, were formed by embossing at intervals of 1 mm in the length and width to prepare a mold release sheet.

An acrylic adhesive (BPS-5160: Toyo Ink Mfg. Co., Ltd.) was applied to the surface of the mold release sheet provided with the cone-shaped depressions in the amount of 70 g/m$^2$ and dried to form a pressure-sensitive type adhesion layer.

Figure 4:
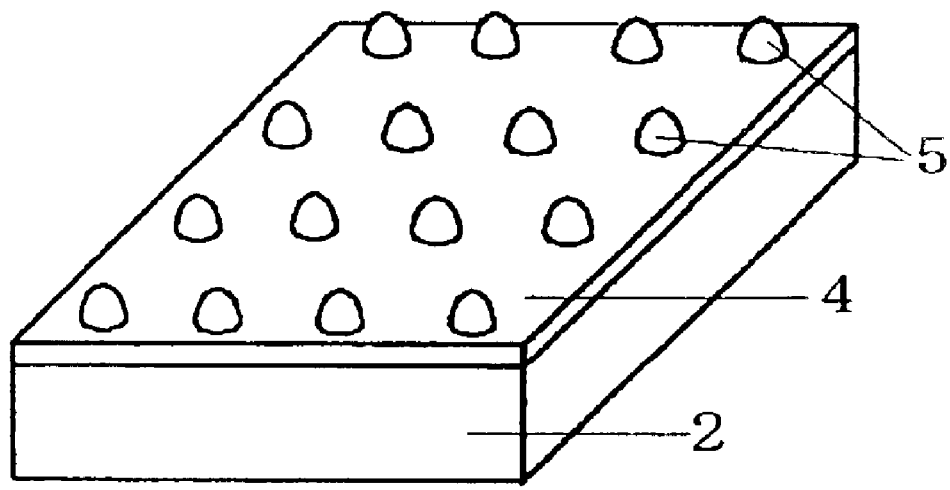
FIG. 4 is a perspective view showing one example where an adhesion layer having projections is formed on a white plastic film surface.

The adhesion layer surface of the mold release sheet and one surface of a white plastic film (Lumirror E60L: Toray Industries Inc.) having a thickness of 188 μm were laminated, and then the mold release sheet was peeled from the white plastic film so that the adhesion layer was transferred to the white plastic film (FIG. 4). The adhesion layer surface and one surface of another white plastic film having a thickness of 188 μm (Lumirror E60L: Toray Industries Inc.) were laminated to produce the light-reflective material of the present invention (FIG. 3).

Example 2

Figure 5:
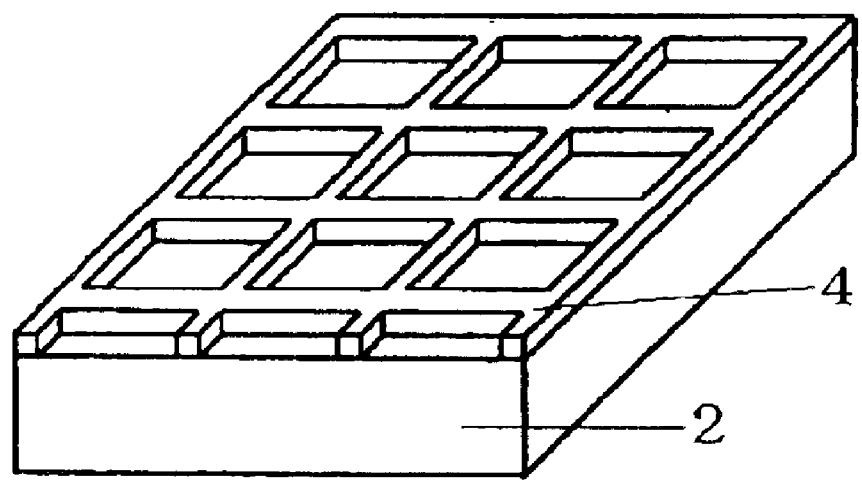
FIG. 5 is a perspective view showing one example where an adhesion layer is formed on portions of a surface of the white plastic film.

A UV-curable type adhesive (UV TAC4100: Teikoku Printing Inks Mfg. Co., Ltd.) was screen-printed on one surface of a white plastic film (Lumirror E60L: Toray Industries Inc.) having a thickness of 188 μm in a lattice so that the adhesion layer had a width of 0.3 mm, a gap (one side) of 3 mm and a thickness of 20 μm, and UV-cured to form a pressure-sensitive type adhesion layer (FIG. 5).

This adhesion layer of the white plastic film and one surface of another white plastic film (Lumirror E60L: Toray Industries Inc.) having a thickness of 188 μm were laminated to produce the light-reflective material of the present invention (FIG. 2).

Comparative Example

An acrylic adhesive (BPS-5160: Toyo Ink Mfg. Co., Ltd.) was applied over the whole surface of a white plastic film (Lumirror E60L: Toray Industries Inc.) having a thickness 188 μm and dried to form a pressure-sensitive type adhesion layer having a thickness 20 μm.

This adhesion layer of the white plastic film and one surface of another white plastic film (Lumirror E60L: Toray Industries Inc.) having a thickness of 188 μm were laminated to produce a light-reflective material.

The light-reflective materials of Examples 1 and 2 and the Comparative Example obtained as described above were placed on a surface of a light guide plate of an edge-light type backlight unit, opposite its light emitting surface as shown in FIG. 7, and brightness (front brightness) in the direction normal to the light-emitting surface was measured. The measured results are shown in Table 1.

The light-reflective materials of Examples 1 and 2 and the Comparative Example obtained as described above were also incorporated in a direct type backlight unit as shown in FIG. 6(a) as a light refection plate, and brightness (front brightness) in the direction normal to the light-emitting surface was measured. The measured results are also shown in Table 1.

Further, diffusion reflectances of the light-reflective materials of Examples 1 and 2 and the Comparative Example were measured at 650 nm, 550 nm and 450 nm by using a spectrophotometer (UV-3101PC: Shimazu Corporation). These measured results are also shown in Table 1.

TABLE 1

|  | Brightness (cd/m$^2$) | | Reflectance (%) | | |
|---|---|---|---|---|---|
|  | Edge light | Vertical type | 650 nm | 550 nm | 450 nm |
| Example 1 | 422 | 494 | 96.4 | 96.6 | 96.5 |
| Example 2 | 419 | 491 | 96.4 | 96.5 | 96.5 |
| Comparative Example | 410 | 480 | 96.2 | 96.3 | 96.1 |

As evident from the results in Table 1, the diffusion reflectances of the light-reflective materials obtained in Examples 1 and 2 were higher with light at all measured wavelengths than the light-reflective material of the Comparative Example, which was formed by bonding the whole surfaces of the two white plastic films. Brightness of the backlight unit incorporating either of these materials of Examples 1 and 2 was also excellent.

Since the light-reflective material of the present invention comprises a laminate formed by partly bonding at least two white plastic films while holding space therebetween, light reflectance can be efficiently increased, and brightness of a flat light source can be improved without increasing the number of components.

What is claimed is:

1. A light-reflective material comprising a laminate formed by bonding together portions of at least two white plastic films while holding space between other portions of said at least two white plastic films.

2. The light-reflective material according to claim 1, wherein the dimension of the space in direction of the thickness of the white plastic films is in the range of 5 to 50 μm.

3. A light source device comprising a light guide plate, a light source disposed at least at one end of the light guide plate, and a light-reflective material disposed partially surrounding the light source and/or on a surface opposite a light-emitting surface of the light guide plate, wherein the light-reflective material according to claim 1 is used as the light-reflective material.

4. A light source device comprising one or a plurality of light sources disposed in a substantially planar array, a light diffusion material disposed on one side of the one light or array of light sources and a light-reflective material disposed on the other side, wherein the light-reflective material according to claim 1 is used as the light-reflective material.

5. A light-reflective material comprising a laminate formed by partially bonding together at least two white plastic films through an adhesion layer formed on portions of a first surface of one of the white plastic films while holding space between other portions of said white plastic film first surface and a second surface of another white plastic film bonded to said first surface.

6. A light source device comprising a light guide plate, a light source disposed at least at one end of the light guide plate, and a light-reflective material disposed partially surrounding the light source and/or on a surface opposite a light-emitting surface of the light guide plate, wherein the light-reflective material according to claim 5 is used as the light-reflective material.

7. A light source device comprising one or a plurality of light sources disposed in a substantially planar array, a light diffusion material disposed on one side of the one light source or array of light sources and a light-reflective material disposed on the other side, wherein the light-reflective material according to claim 5 is used as the light-reflective material.

8. A light-reflective material comprising a laminate formed by partially bonding together at least two white plastic films through an adhesion layer having projections and which is formed on a surface of a first white plastic film wherein a surface of a second white plastic film is bonded to said projections while holding space between said first and second white films.

9. A light source device comprising a light guide plate, a light source disposed at least at one end of the light guide plate, and a light-reflective material disposed partially surrounding the light source and/or on a surface opposite a light-emitting surface of the light guide plate, wherein the light-reflective material according to claim 8 is used as the light-reflective material.

10. A light source device according to claim 9 wherein said second white plastic film surface is bonded to said projections by melting tops of said projections with heat or solvent and superimposing the second white plastic film on the projections with melted tops to form fusion bonds therebetween.

11. A light source device according to claim 10 wherein no other substance is between said white plastic films.

12. A light source device according to claim 10 wherein said projections are scattered over the surface of said first white plastic film and each of said projections is surrounded by said space.

13. A light source device comprising one or a plurality of light sources disposed in a substantially planar array, a light diffusion material disposed on one side of the one light source or array of light sources and a light-reflective material disposed on the other side, wherein the light-reflective material according to claim 8 is used as the light-reflective material.

14. A light source device according to claim 13 wherein said second white plastic film surface is bonded to said projections by melting tops of said projections with heat or solvent and superimposing the second white plastic film on the projections with melted tops to form fusion bond therebetween.

15. A light source device according to claim 14 wherein said projections are scattered over the surface of said first white plastic film and each of said projections is surrounded by said space.

16. A light source device according to claim 13 wherein no other substance is between said white plastic films.

* * * * *